(12) United States Patent
Tang

(10) Patent No.: US 11,832,766 B2
(45) Date of Patent: Dec. 5, 2023

(54) GRINDER

(71) Applicant: Samson Bright Industrial Company Limited, Hong Kong (CN)

(72) Inventor: Wing Sum Tang, Vancouver (CA)

(73) Assignee: Samson Bright Industrial Company Limited, Hong Kong (CN)

( * ) Notice: Subject to any disclaimer, the term of this patent is extended or adjusted under 35 U.S.C. 154(b) by 3 days.

(21) Appl. No.: 17/650,865

(22) Filed: Feb. 14, 2022

(65) Prior Publication Data
US 2023/0255404 A1    Aug. 17, 2023

(51) Int. Cl.
*A47J 42/34*    (2006.01)
*A47J 42/40*    (2006.01)

(52) U.S. Cl.
CPC .............. *A47J 42/34* (2013.01); *A47J 42/40* (2013.01)

(58) Field of Classification Search
CPC .. A47J 42/02; A47J 42/04; A47J 42/08; A47J 42/10; A47J 42/38; A47J 42/40
See application file for complete search history.

(56) References Cited

U.S. PATENT DOCUMENTS

| 2002/0117567 | A1* | 8/2002 | Lee | A47J 42/04 |
| | | | | 241/169.1 |
| 2004/0182958 | A1* | 9/2004 | Herren | A47J 42/08 |
| | | | | 241/169.1 |
| 2012/0006922 | A1* | 1/2012 | Wilson | A47J 42/08 |
| | | | | 241/293 |
| 2021/0204756 | A1* | 7/2021 | Tang | A47J 42/04 |
| 2022/0175189 | A1* | 6/2022 | Davidson | A47J 42/04 |

* cited by examiner

*Primary Examiner* — Matthew Katcoff
*Assistant Examiner* — Mohammed S. Alawadi
(74) *Attorney, Agent, or Firm* — S&F/WEHRW

(57) ABSTRACT

In a grinder, inner and outer burrs are used for grinding condiment solids into fine grains with a grain size controllable by an inter-burr distance. The grinder has a first body part aligned with a second body part. A separation between the first and second body parts is adjustable by at most a predetermined limited distance, allowing a user to select the grain size by compressing the first and second body parts to alter the inter-burr distance. An undulating ring that is non-metallic and compressively resilient is positioned between the first and second body parts to push the two body parts away from each other after the user stops compressing the two body parts, avoiding the inter-burr distance to be stuck at a most-recently used value without a need of using a metallic spring to rebound the two body parts. A manufacturing cost of the grinder is reduced.

18 Claims, 7 Drawing Sheets

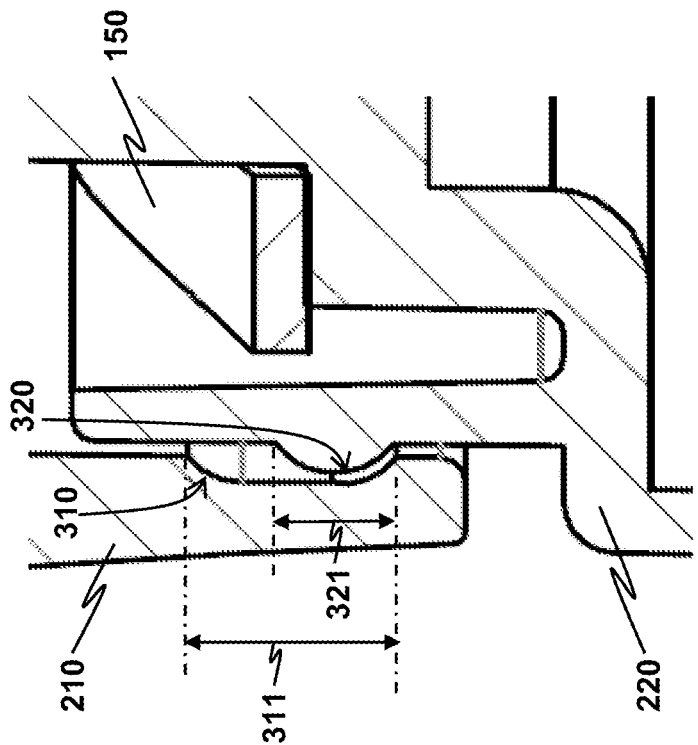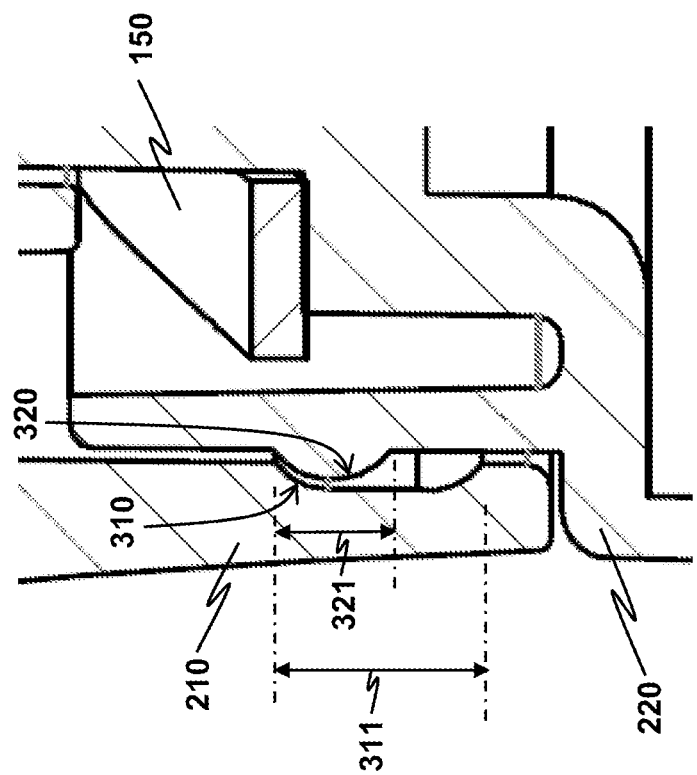
FIG. 6

GRINDER

ABBREVIATIONS

3D Three-dimensional
PE Polyethylene
PMMA Poly(methyl methacrylate)
PP Polypropylene

FIELD OF THE INVENTION

The present invention relates to a grinder for grinding condiment solids into fine grains.

BACKGROUND

In marketing a condiment product, such as a bag of edible salt or a package of pepper seeds, there is a trend that the condiment product includes a disposable grinder for grinding condiments in the product into fine grains in order to provide user convenience. To further improve user convenience, the disposable grinder is usually provided with a control mechanism for controlling a grain size of the fine grains.

In one commonly-used realization, the grinder is equipped with an inner burr and an outer burr for grinding the condiments. One technique for enabling the grinder to provide a controllable grain size is to alter an inter-burr distance between the inner and outer burrs, as disclosed in, e.g., US 2021/0204756A1. This technique often requires installing a coil spring in the grinder for returning the inter-burr distance back to a default value after a user finishes grinding the condiments; otherwise, the inter-burr distance would stay at the most-recently deployed value, causing inconvenience to the user in a next round of grinding, e.g., after a few hours later. To provide a sufficient rebounding force for the spring coil and to employ a well-established manufacturing process of forming the coil spring from a thin wire, metal is usually selected for forming the coil spring. However, metals are generally costly. Keeping a low cost in manufacturing the disposable grinder is usually a prime requirement in order to minimize a unit cost of the condiment product. In addition, there is an increasing awareness in food safety. If a metallic coil spring is in direct contact with a condiment to be ground, there is a possibility that the metal content in the condiment may be unintentionally increased.

There is a need in the art for a grinder that allows the grain size of fine grains due to grinding to be controllable while avoiding the use of a metallic spring in resetting the inter-burr distance so as to reduce a manufacturing cost of the grinder and potentially increase a level of food safety achievable in using the grinder.

SUMMARY OF THE INVENTION

An aspect of the present invention is to a grinder for grinding condiment solids into fine grains with a particular advantage of not using a metallic spring in the grinder.

The grinder comprising a first body part and a second body part. The first body part comprises an inner burr. The inner burr is fixed in the first body part. The second body part comprises an outer burr. The outer burr is fixed in the second body part. The first and second body parts are attached to each other and are aligned along a common axis. The inner and outer burrs are collectively used for grinding the condiment solids with a grain size of the fine grains being controllable by controlling an inter-burr distance measured along an axial direction parallel to the common axis. The first and second body parts are rotatable to each other about the common axis such that the inner and outer burrs are rotatable to each other for grinding the condiment solids. A separation between the first and second body parts as measured along the axial direction is adjustable by at most a predetermined limited distance, allowing a user to select the grain size by compressing the first and second body parts to alter the inter-burr distance. Advantageously, the grinder further comprises an undulating ring that is non-metallic and compressively resilient. The undulating ring is positioned between the first and second body parts and is arranged to push the first and second body parts away from each other after the user stops compressing the first and second body parts. It advantageously avoids the inter-burr distance to be stuck at a most-recently used value without a need to use a metallic spring to rebound the first and second body parts. Thereby, a manufacturing cost of the grinder is reduced.

Preferably, the undulating ring is substantially composed of PP or PE.

It is also preferable that the first body part further comprises a first flange, and the second body part further comprises a second flange. The undulating ring is sandwiched between the first and second flanges for pushing the first and second body parts away from each other after the user stops compressing the first and second body parts.

In certain embodiments, each of the first and second body parts is substantially composed of PMMA or PP.

Preferably, the first body part further comprises a locking member, and the second body part further comprises a complementary locking member. The locking member is fixed in the first body part, and the complementary locking member is fixed in the second body part. The complementary locking member engages with the locking member for attaching the first and second body parts together. The two locking members are slidable to each other along a tangential direction perpendicular to the common axis so as to cause the first and second body parts to be rotatable. The two locking members are further slidable to each other along the axial direction over a length of the predetermined limited distance so as to cause the separation between the first and second body parts as measured along the axial direction to be adjustable by at most the predetermined limited distance.

In one embodiment, the locking member is a groove on the first body part and the complementary locking member is a rim on the second body part. In another embodiment, the locking member is a rim on the first body part and the complementary locking member is a groove on the second body part. In both of the aforementioned embodiments, preferably a width of the groove is longer than a thickness of the rim by the predetermined limited distance as measured along the axial direction.

In certain embodiments, the first body part is integrally formed with the outer burr and the locking member, and the second body part is integrally formed with the inner burr and the complementary locking member.

In certain embodiments, the first body part further comprises a first casing, and the second body part further comprises a second casing. The first and second casings enable the user to manually hold one body part while rotating another body part to thereby provide user convenience.

Preferably, the first body part further comprises an openable cover for releasing the fine grains when the grinder grinds the condiment solids. The openable cover may be installed on the first casing.

The locking member may be integrally formed on the first casing. The complementary locking member may be integrally formed on the second casing.

In certain embodiments, the first body part further comprises a supporting frame located centrally at the first body part and fixed to the first casing, and the second body part further comprises an outer-burr holder fixed to the second casing. The supporting frame is configured to engage with the inner burr for fixing the inner burr in the first body part. The outer-burr holder is configured to engage with the outer burr for fixing the outer burr in the second body part.

In certain embodiments, the supporting frame includes a shaft, and the inner burr is formed with a hole engageable with the shaft. Preferably, the shaft is shaped as a triangular column for more effectively transmitting a torque received by the first casing to the inner burr.

In certain embodiments, a screw thread is formed on the second body part for engaging with an external container.

Other aspects of the present invention are disclosed as illustrated by the embodiments hereinafter.

BRIEF DESCRIPTION OF THE DRAWINGS

FIG. 6 depicts enlarged cross-sectional views of the grinder in the vicinity of the two locking members under (a) a first condition that the user is compressing the first and second body parts, and (b) a second condition that the first and second body parts are free from compression.

Skilled artisans will appreciate that elements in the figures are illustrated for simplicity and clarity and have not necessarily been depicted to scale.

DETAILED DESCRIPTION

As used herein in the specification and appended claims, the term "avoid" or "avoiding" refers to any method to partially or completely preclude, avert, obviate, forestall, stop, hinder or delay the consequence or phenomenon following the term "avoid" or "avoiding" from happening. The term "avoid" or "avoiding" does not mean that the method is necessarily absolute, but rather effective for providing some degree of avoidance or prevention or amelioration of consequence or phenomenon following the term "avoid" or "avoiding".

Disclosed herein is a grinder for grinding condiment solids into fine grains with a particular advantage that a metallic spring is not used in the grinder for resetting an inter-burr distance between an inner burr and an outer burr after a user stops grinding the condiment solids with a user-selected inter-burr distance. Absence of the metallic spring allows a manufacturing cost of the grinder to be reduced, and potentially increases a level of food safety by avoiding direct contact of the condiment solids or fine grains with metal. The disclosed grinder is particularly useful to be used as a disposable grinder for grinding condiments, such as salt crystals, pepper seeds, spices, mustard seeds and sesame seeds. Despite this, the disclosed grinder is not limited to being used as the disposable grinder.

The disclosed grinder is exemplarily illustrated hereinafter with the aid of FIGS. 1-6.

Figure 1:
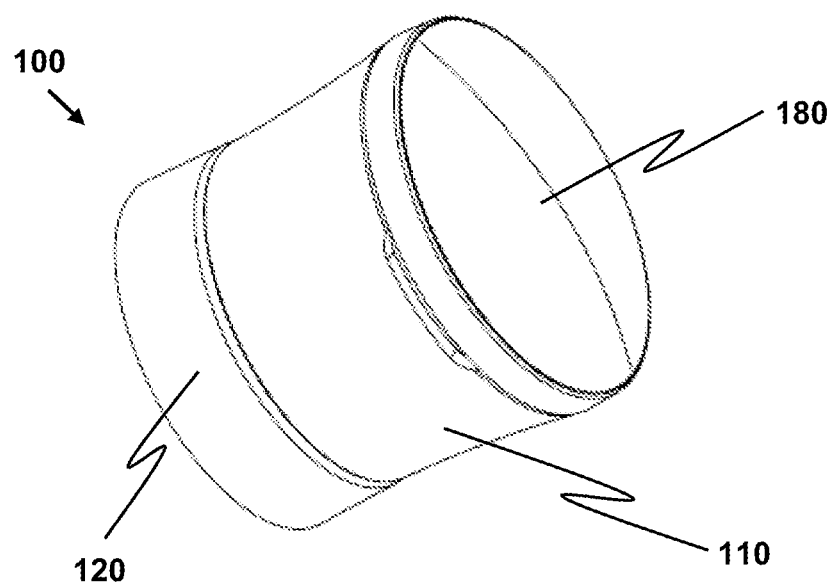
FIG. 1 depicts a perspective view of a grinder for grinding condiment solids into fine grains in accordance with an exemplary embodiment of the present invention, showing that the grinder has an openable cover, a first body part and a second body part where the first body part is located between the openable cover and the second body part.
Figure 2:
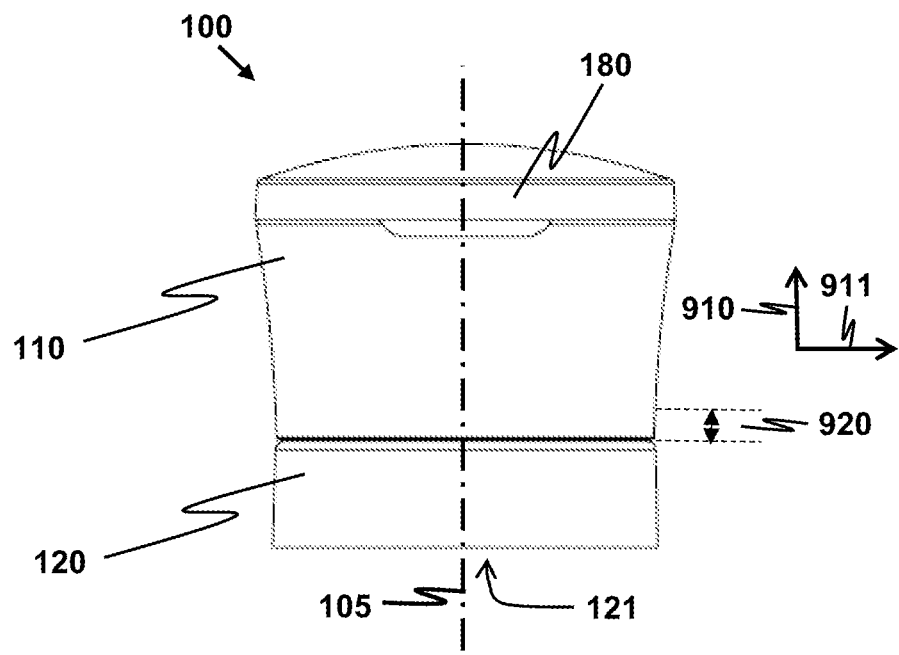
FIG. 2 depicts a side view of the grinder of FIG. 1, indicating that the first and second body parts are aligned along a common axis of the grinder and that a user may control a grain size of the fine grains by pressing the first body part toward the second body part.

FIGS. 1 and 2 depict a perspective view of a grinder 100 and a side view thereof, respectively. The grinder 100 comprises a first body part 110 and a second body part 120. The first and second body parts 110, 120 are assembled together. In particular, the first and second body parts 110, 120 are attached to each other and are aligned along a common axis 105 after the first and second body parts 110, 120 are assembled together. The combination of the first and second body parts 110, 120 forms a grinder body.

Figure 3:
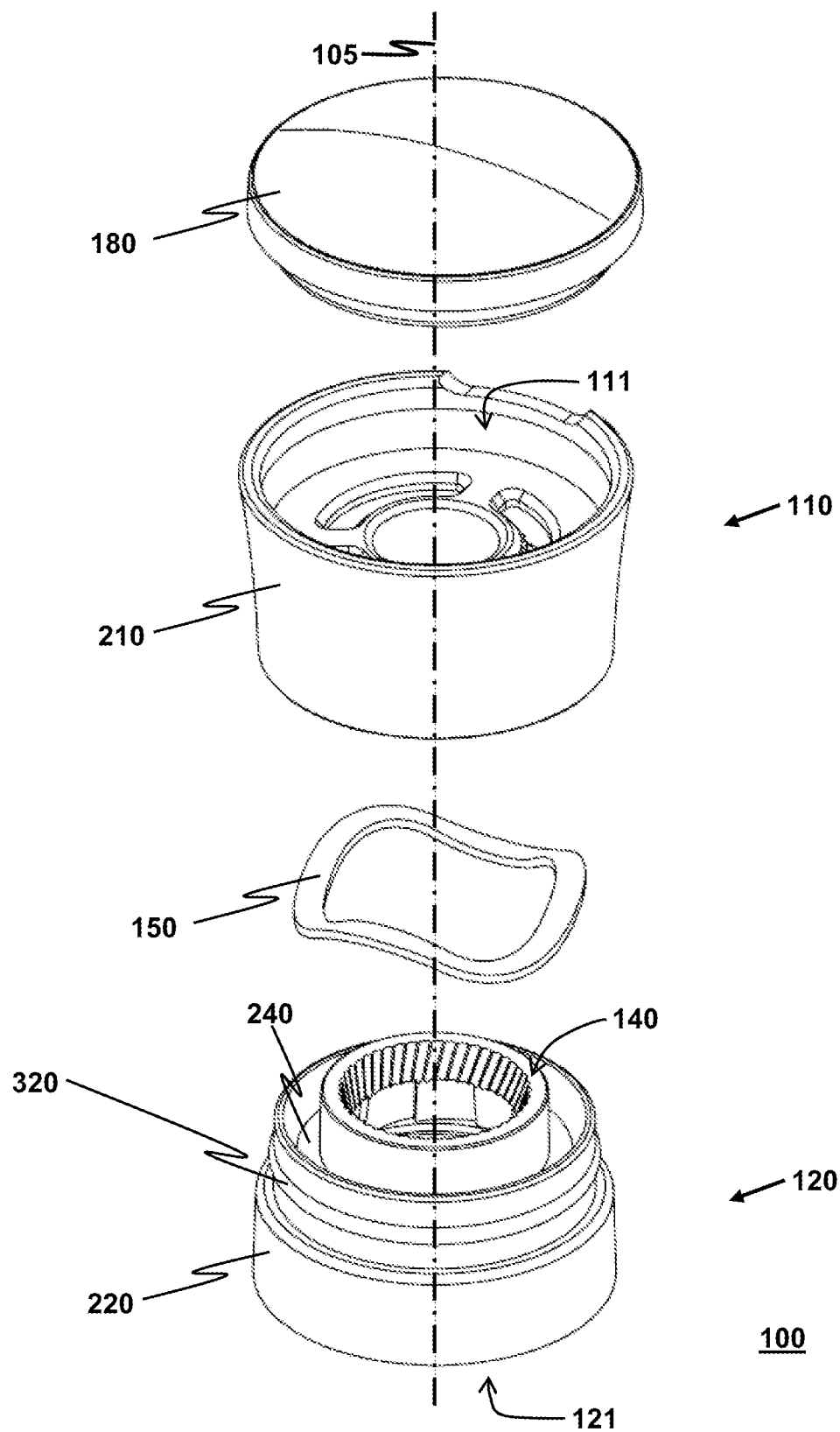
FIG. 3 depicts a first exploded view of the grinder, showing an assembling plan thereof and indicating that an undulating ring is located between the first and second body parts, where the undulating ring is arranged to push the first and second body parts away from each other after a user stops compressing the first and second body parts.
Figure 4:
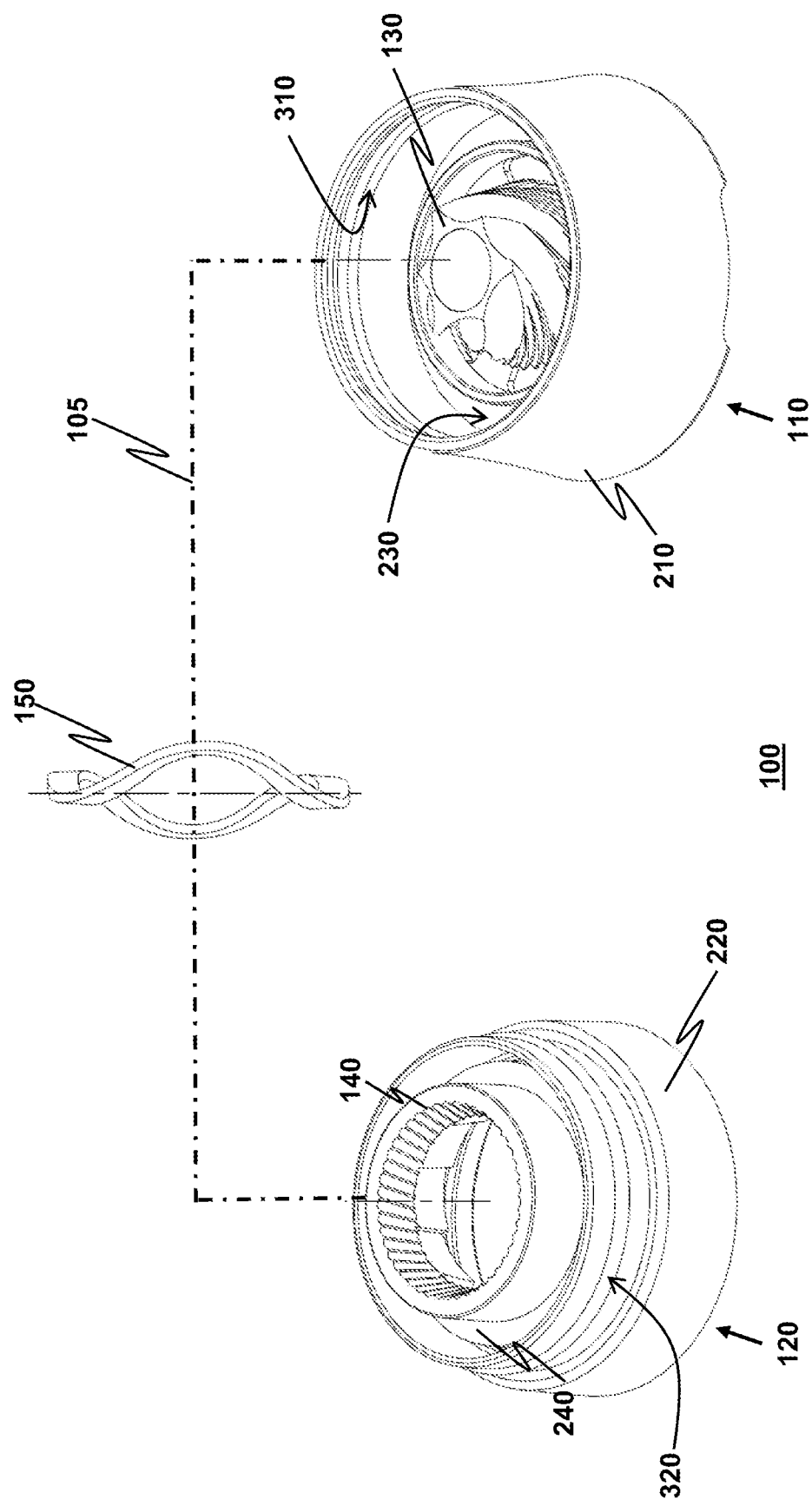
FIG. 4 depicts a second exploded view of the grinder, showing an internal structure thereof including an inner burr and an outer burr, and illustrating that a locking member on the first body part is locked to a complementary locking member on the second body part in assembling the grinder.

FIGS. 3 and 4 depicts first and second exploded views of the grinder 100 for illustrating an assembling plan of the grinder 100 and showing an internal structure of the grinder 100, respectively. In the first exploded view, components of the grinder 100 are aligned and assembled along the common axis 105, which is drawn as a straight line in FIG. 3. In the second exploded view, the components are also aligned and assembled along the common axis 105, but the common axis 105 is redrawn and distorted as a curve in FIG. 4 for revealing several components that are hidden in the first exploded view. As shown in FIGS. 3 and 4, the first body part 110 comprises an inner burr 130, and the second body part 120 comprises an outer burr 140. The inner burr 130 and the outer burr 140 are fixed, viz., immobilized, in the first body part 110 and in the second body part 120, respectively.

Refer to FIG. 2. Denote a first direction parallel to the common axis 105 as an axial direction, and a second direction perpendicular to the common axis 105 as a tangential direction. One example of the axial direction is a direction 910, and another example thereof is an opposite direction to the direction 910. Similarly, one example of the tangential direction is a direction 911, and another example thereof is an opposite direction to the direction 911. Unless otherwise stated, the axial direction and the tangential direction are herein referenced as 910 and 911, respectively, although it is understood that the direction 910 is one realization of the axial direction and that the direction 911 is also one realization of the tangential direction.

Refer to FIGS. 2 and 3. During using the grinder 100 to grind the condiment solids, the grinder 100 is held upside down. The condiment solids enter into the grinder 100 through an end 121 of the second body part 120. The end 121 is referred to as an entry end 121. The condiment solids drop into the grinder 100 through the entry end 121 by gravity, and are thereafter ground to become the fine grains by the inner and outer burrs 130, 140. The fine grains reach an end 111 of the first body part 110. The end 111 is referred to as an exit end 111. Preferably, the first body part 110 further comprises an openable cover 180 for releasing the fine grains during deployment of the grinder 100. The openable cover 180 is also used for covering the exit end 111 during standby time to guard off dust and dirt from reaching into the interior part of the grinder 100.

Figure 5:
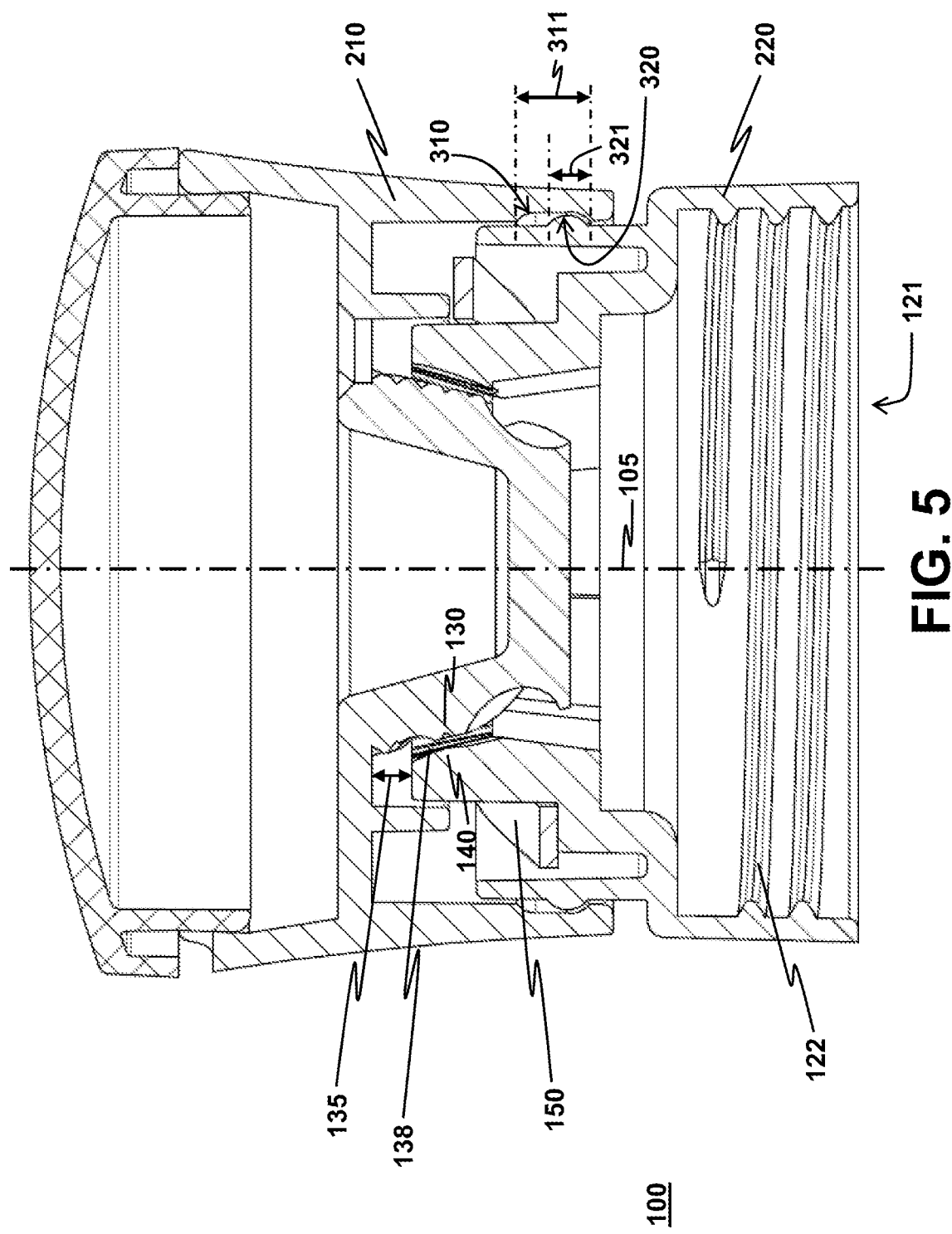
FIG. 5 depicts a cross-section view of the grinder.

The inner burr 130 and the outer burr 140 are collectively used for grinding the condiment solids. The inner burr 130 is usually shaped as a truncated cone with grinding teeth formed on a lateral side of the inner burr 130. Typically, the outer burr 140 has a shape of a tube, with grinding teeth formed on an interior surface of the tube. Refer to FIG. 5, which depicts a cross-sectional view of the grinder 100. In the grinder 100, at least part of the inner burr 130 resides inside the outer burr 140. Usually, a substantial part of the inner burr 130, or the whole inner burr 130, resides in the outer burr 140. It follows that a chamber 138 is formed by the inner and outer burrs 130, 140 and is surrounded by the teeth of the inner and outer burrs 130, 140. The condiment solids are ground inside the chamber 138 to form the fine grains. The narrowest part of the chamber 138 determines a grain size of the fine grains. In particular, the dimension of the narrowest part is correlated to an inter-burr distance 135 between the inner and outer burrs 130, 140, where the inter-burr distance 135 is measured along the axial direction 910. Apart from the inner burr 130 and the outer burr 140 as disclosed above, other designs of the pair of burrs, such as the designs disclosed in U.S. Pat. No. 9,578,989B2 and CN 2572897Y, may also be used.

The first and second body parts 110, 120 are configured to be rotatable to each other, causing the inner and outer burrs 130, 140 to be rotatable to each other for carrying out grinding the condiment solids. In addition, the first and second body parts 110, 120 are further configured such that a separation between the first and second body parts 110, 120 as measured along the axial direction 910 is adjustable by at most a predetermined limited distance 920. That is, the separation may be shortened or extended under a constraint that the maximum separation and the minimum separation differ by the predetermined limited distance 920. As a result, a user of the grinder 100 is allowed to select the grain size by compressing the first and second body parts 110, 120 to alter the inter-burr distance 135. Note that the inter-burr distance 135 is adjustable such that maximum and minimum values of the inter-burr distance 135 differ by the predetermined limited distance 920. In measuring the separation, specifically, the separation is measured along the axial direction 910 between two reference points respectively located on the first and second body parts 110, 120.

The grinder 100 further comprises an undulating ring 150 that is non-metallic and compressively resilient. A compressively resilient object is an object that springs back to substantially an original shape after a compressive force that deforms the object is removed. The undulating ring 150, which is a wavy ring, is shaped to form undulations or waves that extend over the undulating ring 150. The undulating ring 150 is made compressively resilient with a rebounding force pushing back compression by selecting an appropriate material to manufacture the undulating ring 150. Since the undulating ring 150 forms a complete ring and is different from a helical spring, which has two ends open and is often formed by a thin wire, a wider range of materials, including metals and non-metals, is usable to make the undulating ring 150 and confer the ring 150 with resilient capability against compression. Non-metals that are suitable for making the undulating ring 150 having compressive-resilience capability include PP and PE. In the grinder 100, the undulating ring 150 is positioned between the first and second body parts 110, 120 and is arranged to push the first and second body parts 110, 120 away from each other after the user stops compressing the first and second body parts 110, 120. Advantageously, the resilience action of the undulating ring 150 avoids the inter-burr distance 135 to be stuck at a most-recently used value as used by the user in grinding the condiment solids without a need for the grinder 100 to use a metallic spring to rebound the first and second body parts 110, 120. As a useful result, it reduces a manufacturing cost of the grinder 100.

Preferably, the undulating ring is substantially composed of PP or PE. Other appropriate polymer-based materials may also be used.

Preferably, the first body part 110 further comprises a first flange 230, and the second body part 120 further comprises a second flange 240. See FIG. 4. The first and second flanges 230, 240 are fixed in the first and second body parts 110, 120, respectively. The undulating ring 150 is sandwiched between the first and second flanges 230, 240, enabling the undulating ring 150 to exert a rebounding force against the first and second body parts 110, 120 for pushing the first and second body parts 110, 120 away from each other after the user stops compressing the first and second body parts 110, 120.

In certain embodiments of the grinder 100, the first body part 110 is integrally formed with the first flange 230 and the second body part 120 is integrally formed with the second flange 240. It simplifies manufacturing of the grinder 100 in that assembling the first and second flanges 230, 240 to the first and second body parts 110, 120, respectively, is not required.

Since the first and second body parts 110, 120 are mutually rotatable during grinding the condiment solids, and since the undulating ring 150 is usually pressed by the first and second body parts 110, 120 when the grinding is carried out, the undulating ring 150 is subject to wear. It is preferable to reduce a likelihood of generating wear debris. In one approach, contact surfaces of the first flange 230, the second flange 240 and the undulating ring 150 are smooth so as to reduce a likelihood of generating wear debris. It is also possible to use a low-friction low-wear material to produce the first body part 110, the second body part 120 and the undulating ring 150. For example, low-friction low-wear polymers and polymer composites as disclosed in U.S. Pat. No. 7,314,646B2 may be used.

Note that if the grinder 100 is used as a disposable grinder, the grinder 100 is expected to have a relatively short lifetime of deployment before it is abandoned. The level of wear experienced by the disposable grinder may be negligible and thus tolerable over the grinder lifetime. Commonly-used plastics or polymers may be used to construct the first flange 230, the second flange 240 and the undulating ring 150.

Other implementation details of the grinder 100 are elaborated as follows.

Preferably, as shown in FIG. 3 etc., the first body part 110 further comprises a first casing 210, and the second body part 120 further comprises a second casing 220. The first casing 210 and the second casing 220 provide convenience to the user by enabling the user to manually hold one body part while rotating another body part. In certain embodiments, the openable cover 180 is installed on the first casing 210.

Preferably, the first body part 110 further comprises a locking member 310, and the second body part 120 further comprises a complementary locking member 320. See FIGS. 3-5. The locking member 310 and the complementary locking member 320 are fixed in the first body part 110 and the second body part 120, respectively. During manufacturing the grinder 100, the first and second body parts 110, 120 are separately formed and then assembled together by engaging the locking member 310 with the complementary locking member 320. The engagement of the two locking members 310, 320 causes the first and second body parts 110, 120 to be attached together and to be aligned along the common axis 105.

The locking member 310 and the complementary locking member 320 are configured to be slidable to each other along the tangential direction 911 so as to create a rotation of the first body part 110 relative to the second body part 120 and thereby drive the two burrs 130, 140 to rotate oppositely to each other for carrying out grinding the condiment solids. The locking member 310 and the complementary locking member 320 are additionally configured to be further slidable to each other along the axial direction 910 over a length of the predetermined limited distance 920. It enables the separation between the first and second body parts 110, 120 as measured along the axial direction 910 to be adjustable by at most the predetermined limited distance 920. Note that the locking member 310 is non-fixedly locked to the complementary locking member 320 in the sense that while detachment of the first body part 110 from the second body part 120 during normal operation of the grinder 100 is avoided, constrained movement between the first and second body parts 110, 120 is allowed.

In one embodiment, as shown in FIGS. 4 and 5, the locking member 310 is a groove on the first body part 110 and the complementary locking member 320 is a rim on the second body part 120. The rim and the groove are formed with smooth surfaces for reducing sliding friction between the rim and the groove so as to enable the locking member 310 and the complementary locking member 320 to be mutually slidable. In another embodiment not shown in FIGS. 4 and 5, the locking member 310 is a rim on the first body part 110 and the complementary locking member 320 is a groove on the second body part 120. Similarly, the rim and the groove are formed with smooth surfaces.

In the last-mentioned two embodiments, the groove and the rim may be designed such that a width 311 of the groove is longer than a thickness 321 of the rim by the predetermined limited distance as measured along the axial direction 910. The groove is wider than the rim for providing room for the first and second body parts 110, 120 to move to or away from each other along the axial direction 910 while still allowing the groove to hold the rim within the groove after the two locking members 310, 320 are locked together.

FIG. 6 depicts, for illustrative purposes, enlarged cross-sectional views of the grinder 100 in the vicinity of the two locking members 310, 320 under (a) a first condition that the user is compressing the first and second body parts 110, 120 while grinding the condiment solids, and (b) a second condition that the first and second body parts 110, 120 are free from compression. Specifically, the locking member 310 and the complementary locking member 320 are realized as the groove and the rim, respectively. Under the first condition, the first casing 210 is pressed down towards the second casing 220. The complementary locking member 320 is forced toward, and is blocked by, the upper end of the locking member 310, stopping the first casing 210 from going further downward to the second casing 220. In the second condition, the undulating ring 150 forces the first body part 110 upward to go away from the second body part 120. While the first casing 210 moves up, the complementary locking member 320 meets, and is blocked by, the lower half of the locking member 310, thereby stopping the first casing 210 from going further away from the second casing 220.

In practical situations, the grinder 100 is usually attached to an external container at the entry end 121 located on the second body part 120. As depicted in FIG. 5, a screw thread 122 may be formed on the second body part 120 for engaging with the container. Those skilled in the art will appreciate that apart from the screw thread 122, other arrangements for engaging the second body part 120 and the container are possible. The container is used to store the condiment solids to be ground. When the user wishes to grind the condiment solids, the user turns the grinder 100 integrated with the container upside down to let the condiment solids fall into the grinder 100. Usually and conveniently, the user holds the first body part 110 and rotates the second body part 120 (via rotating the container) to grind the condiment solids into the fine grains.

In certain embodiments, the locking member 310 and the complementary locking member 320 are integrally formed on the first casing 210 and the second casing 220, respectively. For instance, it is practically preferable that the groove and rim used as the locking member 310 and the complementary locking member 320 as mentioned above are formed as parts of the first casing 210 and the second casing 220, respectively.

To reduce a cost of manufacturing the grinder 100, it is preferable that each of the first and second casings 210, 220 is substantially composed of plastic and is manufactured by a standard process such as a molding process or a 3D printing process.

Note that the inner and outer burrs 130, 140 are subject to wear due to the grinding action. However, if the grinder 100 is used as a disposable grinder, the grinder 100 is expected to have a relatively short lifetime of deployment before it is disposed off. The level of wear experienced by the disposable grinder may be negligible and thus tolerable over the grinder lifetime. Plastics or polymers may be used to construct the inner and outer burrs 130. 140. Integration of different components in building the first body part 110 or the second body part 120 is possible to achieve a cost reduction in manufacturing the grinder 100 if the aforesaid components are made by the same material, e.g., plastic.

In certain embodiments, the first body part 110 is integrally formed with the inner burr 130 and the locking member 310, and the second body part 120 is integrally formed with the outer burr 140 and the complementary locking member 320. Each of the first and second body parts 110, 120 may be substantially composed of an appropriate polymer. Examples of the appropriate polymer include PMMA and PP.

Alternatively, the inner and outer burrs 130, 140 may be manufactured as components separate from remaining components of the first and second body parts 110, 120. Practical scenarios that require separate formation of the inner burr 130 and the first casing 210 and subsequent integration of the inner burr 130 and the first casing 210 in manufacturing the grinder 100 include, but are not limited to, the following cases. First, the inner burr 130 is made of an abrasive-resistant material, such as ceramic, for reducing wear due to the grinding action while the first casing 210 is made of another material, e.g., plastic. Second, the first casing 210 has a color different from the color of the inner burr 130 for increasing visual appeal to the user. The first casing 210 may be opaque whereas the inner burr 130 may be transparent (viz., colorless). Third, a series of grinders is produced where the first casing of each grinder has a unique outlook different from other grinders in the series but inner burrs of all the grinders are of same type and are standardized components that are mass produced. The practical scenarios that require separate formation of the outer burr 140 and the second casing 220 and their subsequent integration are similar.

Figure 7:
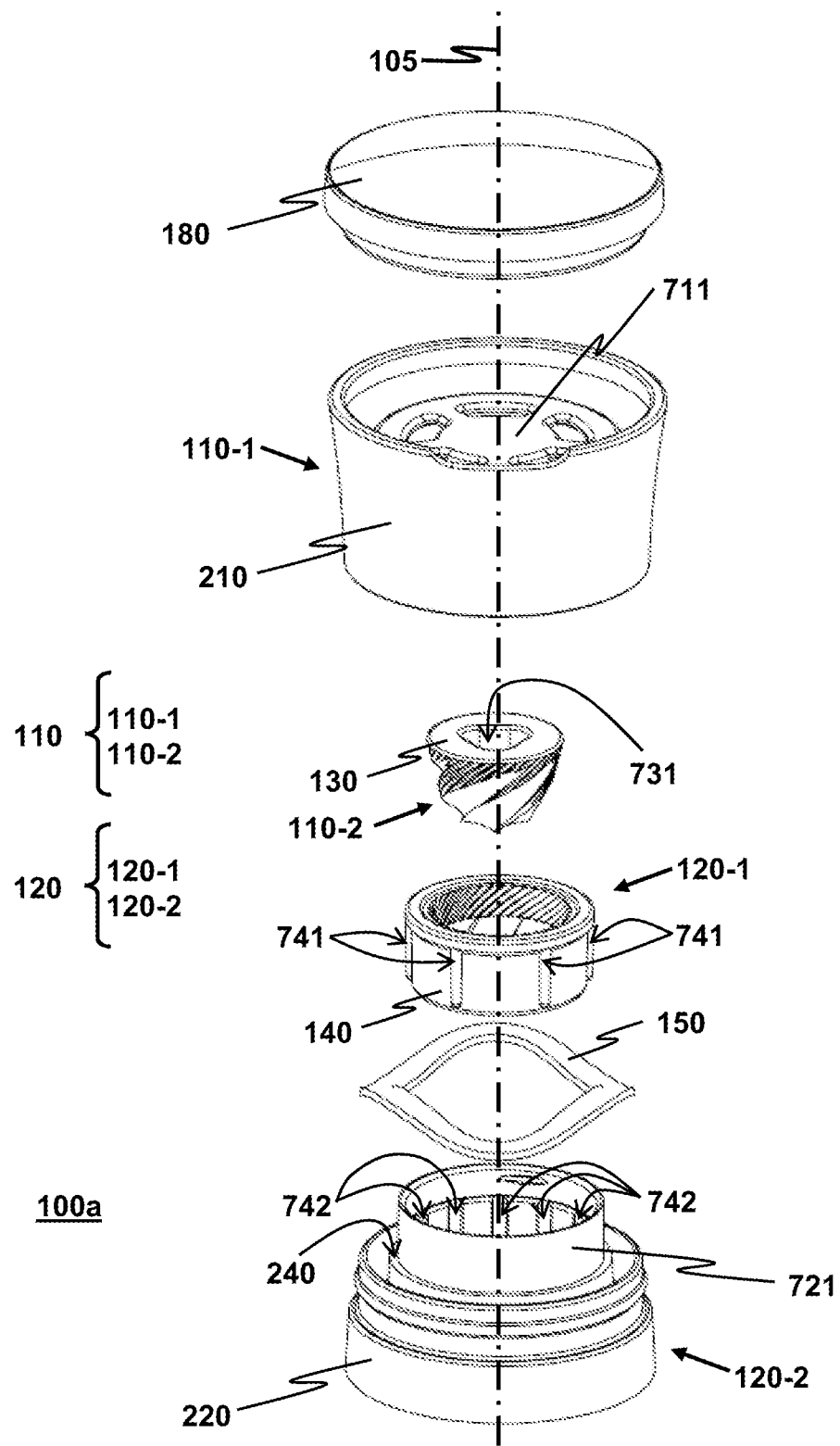
FIG. 7 exemplarily depicts a first exploded view of a variant of the grinder, where the grinder variant has the inner and outer burrs as separate components in forming the first and second body parts, respectively.
Figure 8:
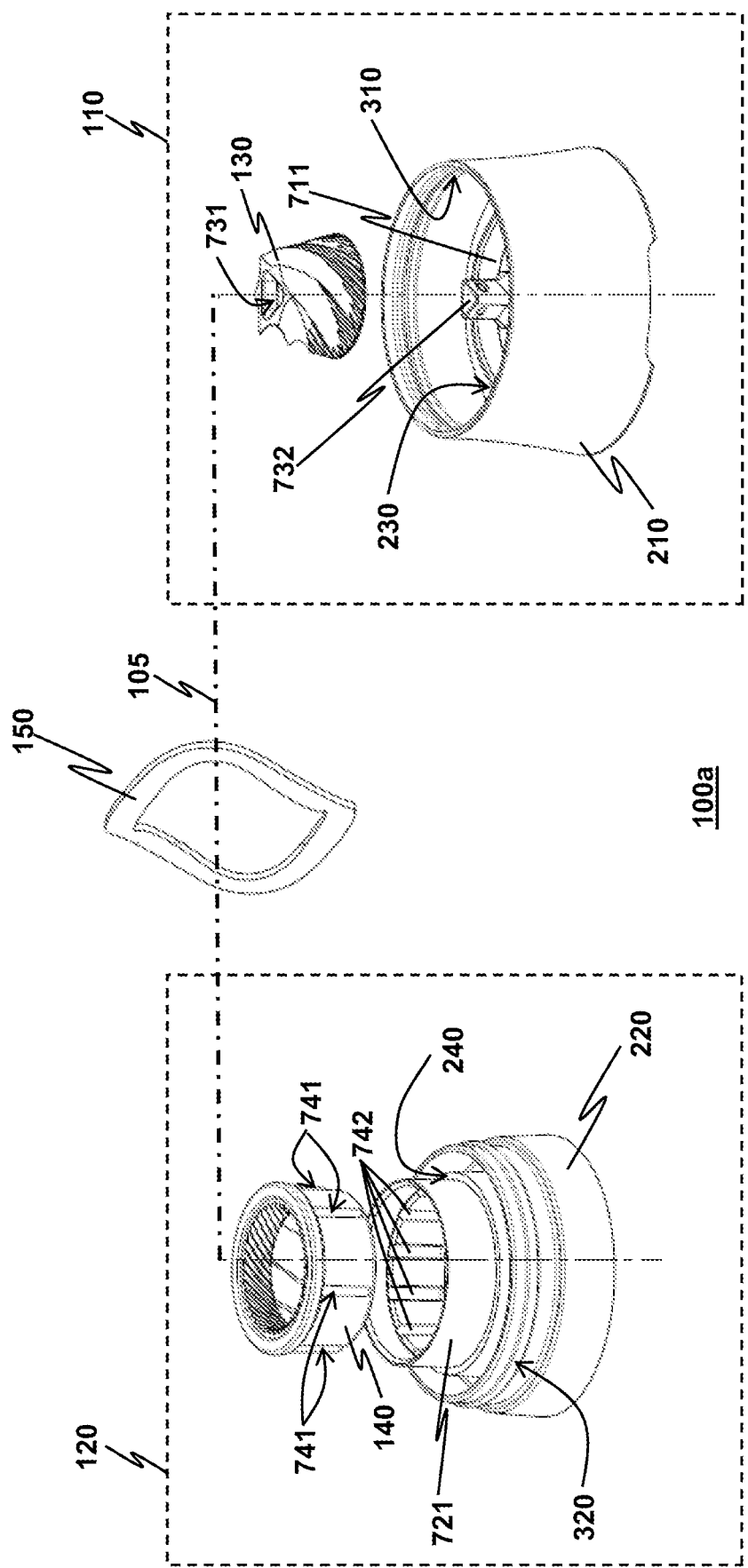
FIG. 8 depicts a second exploded view of the grinder variant of FIG. 7 with a distorted common axis for exposing some components originally invisible in the first exploded view.

As mentioned above, the inner and outer burrs 130, 140 are fixed in the first and second body parts 110, 120, respectively. Since assembling the inner and outer burrs 130, 140 respectively to the first and second body parts 110, 120 is required, a mounting mechanism, such as a pair of key and receptacle, is required for fixing the inner burr 130 to the first body part 110 and for fixing the outer burr 140 to the second body part 120. Exemplarily, FIGS. 7 and 8 depict first and second exploded views, respectively, of a variant of the grinder 100. The grinder variant, herein referred to as a grinder 100a for convenience, is structurally similar to the grinder 100 but the grinder 100a has the inner and outer burrs 130, 140 as separate components in forming the first and second body parts 110, 120, respectively. Similar to FIGS. 3 and 4, the first exploded view in FIG. 7 depicts components aligned along the common axis 105 while the second exploded view in FIG. 8 has the common axis 105 distorted as a curve for exposing components originally out of sight in the first exploded view. In the first body part 110, a supporting frame 711 located centrally at the first body part 110 is fixed to the first casing 210. The supporting frame 711 is configured to engage with the inner burr 130 for fixing the inner burr 130 in the first body part 110. In the second body part 120, an outer-burr holder 721 is fixed to the second casing 220. The outer-burr holder 721 is configured to engage with the outer burr 140 for fixing outer burr 140 in the second body part 120.

In certain embodiments, the supporting frame 711 includes a shaft 732 and the inner burr 130 is formed with a hole 731 engageable with the shaft 732. When the shaft 732 is inserted into the hole 731, the inner burr 130 is locked to the supporting frame 711. The shaft 732 is used to transmit a torque received from the first casing 210 to the inner burr 130. It is preferable that the shaft 732 is shaped as a triangular column for transmitting the torque more effectively than using, e.g., a circular or rectangular column. See US 2021/0204756 A1. It is also preferable that the supporting frame 711 is integrally formed with the shaft 732.

In certain embodiments, the outer burr 140 comprises a plurality of ridges 741, and the outer-burr holder 721 comprises a plurality of grooves 742 insertable by the plurality of ridges 741. When the plurality of ridges 741 is inserted into the plurality of grooves 742, the outer burr 140 is fixed to the outer-burr holder 721 such that outer burr 140 is fixed in the second body part 120.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A grinder for grinding condiment solids into fine grains, the grinder comprising:
   a first body part comprising an inner burr, the inner burr being fixed in the first body part;
   a second body part comprising an outer burr, the outer burr being fixed in the second body part, the first and second body parts being attached to each other and being aligned along a common axis, the inner and outer burrs defining an inter-burr distance for controlling a grain size of the fine grains, the inter-burr distance being measured along an axial direction parallel to the common axis, the first and second body parts being rotatable to each other about the common axis such that the inner and outer burrs are rotatable to each other for grinding the condiment solids, the first and second body parts being configured such that a separation between the first and second body parts as measured along the axial direction is adjustable over a predetermined limited distance to thereby allow the grain size to be selected by compressing the first and second body parts to alter the inter-burr distance; and
   an undulating ring for pushing the first and second body parts away from each other after compressing the first and second body parts to alter the inter-burr distance is stopped, wherein the undulating ring is positioned between the first and second body parts and is non-metallic and compressively resilient for avoiding the inter-burr distance to be stuck at a most-recently used value without a need to use a metallic spring to rebound the first and second body parts.

2. The grinder of claim 1, wherein the undulating ring is composed of polypropylene (PP) or polyethylene (PE).

3. The grinder of claim 1, wherein:
   the first body part further comprises a first flange;
   the second body part further comprises a second flange; and
   the undulating ring is sandwiched between the first and second flanges.

4. The grinder of claim 1, wherein:
   the first body part further comprises a locking member, the locking member being fixed in the first body part; and
   the second body part further comprises a complementary locking member, the complementary locking member being fixed in the second body part, the complementary locking member engaging with the locking member for attaching the first and second body parts together, the locking member and complementary locking member being slidable to each other along a tangential direction perpendicular to the common axis so as to cause the first and second body parts to be rotatable, the locking member and complementary locking member being further slidable to each other along the axial direction over a length of the predetermined limited distance so as to cause the separation between the first and second body parts as measured along the axial direction to be adjustable over the predetermined limited distance.

5. The grinder of claim 4, wherein the first body part is integrally formed with the outer burr and the locking member, and the second body part is integrally formed with the inner burr and the complementary locking member.

6. The grinder of claim 4, wherein the locking member is a groove on the first body part and the complementary locking member is a rim on the second body part.

7. The grinder of claim 6, wherein a width of the groove is longer than a thickness of the rim by the predetermined limited distance as measured along the axial direction.

8. The grinder of claim 4, wherein the locking member is a rim on the first body part and the complementary locking member is a groove on the second body part.

9. The grinder of claim 8, wherein a width of the groove is longer than a thickness of the rim by the predetermined limited distance as measured along the axial direction.

10. The grinder of claim 4, wherein the first body part further comprises a first casing, and the second body part further comprises a second casing.

11. The grinder of claim 10, wherein the first body part further comprises an openable cover installed on the first casing for releasing the fine grains when the grinder grinds the condiment solids.

12. The grinder of claim 10, wherein the locking member is integrally formed on the first casing, and the complementary locking member is integrally formed on the second casing.

13. The grinder of claim 10, wherein:
the first body part further comprises a supporting frame located centrally at the first body part and fixed to the first casing, the supporting frame being configured to engage with the inner burr for fixing the inner burr in the first body part; and
the second body part further comprises an outer-burr holder fixed to the second casing, the outer-burr holder being configured to engage with the outer burr for fixing the outer burr in the second body part.

14. The grinder of claim 13, wherein the supporting frame includes a shaft, and the inner burr is formed with a hole engageable with the shaft.

15. The grinder of claim 14, wherein the shaft is shaped as a triangular column for more effectively transmitting a torque received by the first casing to the inner burr.

16. The grinder of claim 1, wherein the first body part further comprises an openable cover for releasing the fine grains when the grinder grinds the condiment solids.

17. The grinder of claim 1, wherein a screw thread is formed on the second body part for engaging with an external container.

18. The grinder of claim 1, wherein each of the first and second body parts is composed of poly(methyl methacrylate) (PMMA) or polypropylene (PP).

* * * * *